(12) United States Patent
Johnson

(10) Patent No.: US 11,260,463 B1
(45) Date of Patent: Mar. 1, 2022

(54) INTEGRATED TAPPING AND DRILL ATTACHMENT

(71) Applicant: The Tapmatic Corporation, Post Falls, ID (US)

(72) Inventor: Mark F Johnson, Harrison, ID (US)

(73) Assignee: The Tapmatic Corporation, Post Falls, ID (US)

(*) Notice: Subject to any disclaimer, the term of this patent is extended or adjusted under 35 U.S.C. 154(b) by 0 days.

(21) Appl. No.: 16/566,810

(22) Filed: Sep. 10, 2019

(51) Int. Cl.
*B23G 1/46* (2006.01)
*B23B 31/08* (2006.01)
*B23B 45/00* (2006.01)
*B25F 3/00* (2006.01)

(52) U.S. Cl.
CPC ............ *B23G 1/465* (2013.01); *B23B 31/083* (2013.01); *B23B 45/003* (2013.01); *B25F 3/00* (2013.01)

(58) Field of Classification Search
CPC ...... B23B 31/083; B23B 45/003; B23G 1/465; Y10T 408/70; Y10T 279/17017; Y10T 279/26; B25F 1/02; B25F 3/00
See application file for complete search history.

(56) References Cited

U.S. PATENT DOCUMENTS

| | | | | |
|---|---|---|---|---|
| 2,950,490 A | * | 8/1960 | Schwartz | B23G 1/465 408/133 |
| 4,014,421 A | * | 3/1977 | Johnson | B23B 31/086 192/48.91 |
| 4,705,437 A | * | 11/1987 | Johnson | B23G 1/465 192/21 |
| 5,372,465 A | * | 12/1994 | Smith | B23B 31/00 279/101 |
| 5,704,738 A | * | 1/1998 | Sugino | B23B 31/083 279/103 |

\* cited by examiner

*Primary Examiner* — Chwen-Wei Su
(74) *Attorney, Agent, or Firm* — Wells St. John P.S.

(57) ABSTRACT

Disclosed is an integrated tapping and drill attachment which includes a predetermined tapping configuration or mode which provides the desired flexibility for tapping, and also a predetermined drilling configuration or mode which provides the desired concentric and axial guidance as well as the desired rigidity for drilling operations.

6 Claims, 4 Drawing Sheets

INTEGRATED TAPPING AND DRILL ATTACHMENT

CROSS REFERENCE TO RELATED APPLICATION

This application does not claim priority from any other application.

TECHNICAL FIELD

This invention pertains to an integrated tapping and drill attachment.

BACKGROUND OF THE INVENTION

Self-reversing tapping attachments have long been known in the tapping and machining industry for creating reliable tap holes in work pieces. Examples of such prior tapping attachments are illustrated in: U.S. Pat. No. 8,162,573, issued on Apr. 24, 2012, to Tapmatic Corporation; and U.S. Pat. No. 5,865,575, issued on Feb. 2, 1999, to Tapmatic Corporation; and which are each hereby incorporated in their entirety herein by this reference.

Self-reversing tapping attachments are used to create tap holes or apertures with internal screw threads. During the creation of a tap hole with self-reversing tapping attachments, the machine spindle goes through several stages, namely: driving the rotating tap into the tap hole, slowing the forward drive or feed rate and the rotation until the tap comes to a stop in the work piece, reversing the direction of the rotation and accelerating or increasing the reverse rate of rotation to match the desired tap pitch as the tap is retracted.

In a typical situation when a machinist is working to prepare internally threaded screw holes, the machinist will first drill holes through the workpiece using a traditional drill and drill chuck to hold the drill during the operation. The machinist, after drilling the required holes in the workpiece, will then physically or manually remove the drill chuck out of the machine spindle and then install a tapping attachment into the machine spindle and thereafter perform the tapping function, i.e. tap the holes (creating the internally threaded apertures or holes). During the tapping function, the tap is to follow the drilled hole.

For tapping holes, it is desirable to provide what is referred to as compression float or flexibility for the tap, which provides better and more preferable tap holes. For drilling holes on the other hand, it is generally undesirable to provide or even allow compression float because it is understood this allows the drill bit to undesirably move or walk on the workpiece before penetrating it to drill or cut the aperture or drill hole. It is also desirable to provide support so that concentricity is maintained during the operation(s).

One prior attempt to address some of the problems that some embodiments of this invention solve for example, was to provide a special cutting tools sometimes referred to as a "Drap" or combination drill-taps. These cutting tools can be used to drill and tap holes that go all the way through the material. The front of the cutting tool is a drill and the upper portion is a tap. After the drill portion of the cutting tool breaks through the work piece, the tap part can enter the hole to complete the threads.

In some of these prior attempts, others have attempted to use self-reversing tapping attachments with these Draps. However, it was learned that using a normal tapping attachment is undesirable. For example, when drillings it is important that the drill be guided concentrically and it is also best if it is held from moving axially. Normal tapping attachments allow the tap to float axially and the prior art tapping attachments may also typically include some radial play—which allows the drill to move off center when starting into the work piece. If additional pressure is imposed on the drill during the drilling operation, this pressure also tends to cause excess and/or premature wear on the bearings or other mechanisms used to provide the controlled axial movement.

It is an object of some embodiments of this invention to provide such a tapping attachment that strictly guides the drill concentrically and solidly so that the drill enters the workpiece without moving off center. Some embodiments of this invention utilize a taper configuration to guide the drill concentrically and solidly so that it enters the workpiece.

Up until now the industry has not found or provided a reasonable solution to the differing or competing preferred needs of drilling versus tapping.

It is also desirable in some applications of this invention to provide a tapping attachment which additionally provides a relatively quick and easy drilling function, and also that may be used on different types of manually operative machines with rotating spindles, along with automated applications.

Other objects, features, and advantages of this invention will appear from the specification, claims, and accompanying drawings which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

Figure 1:
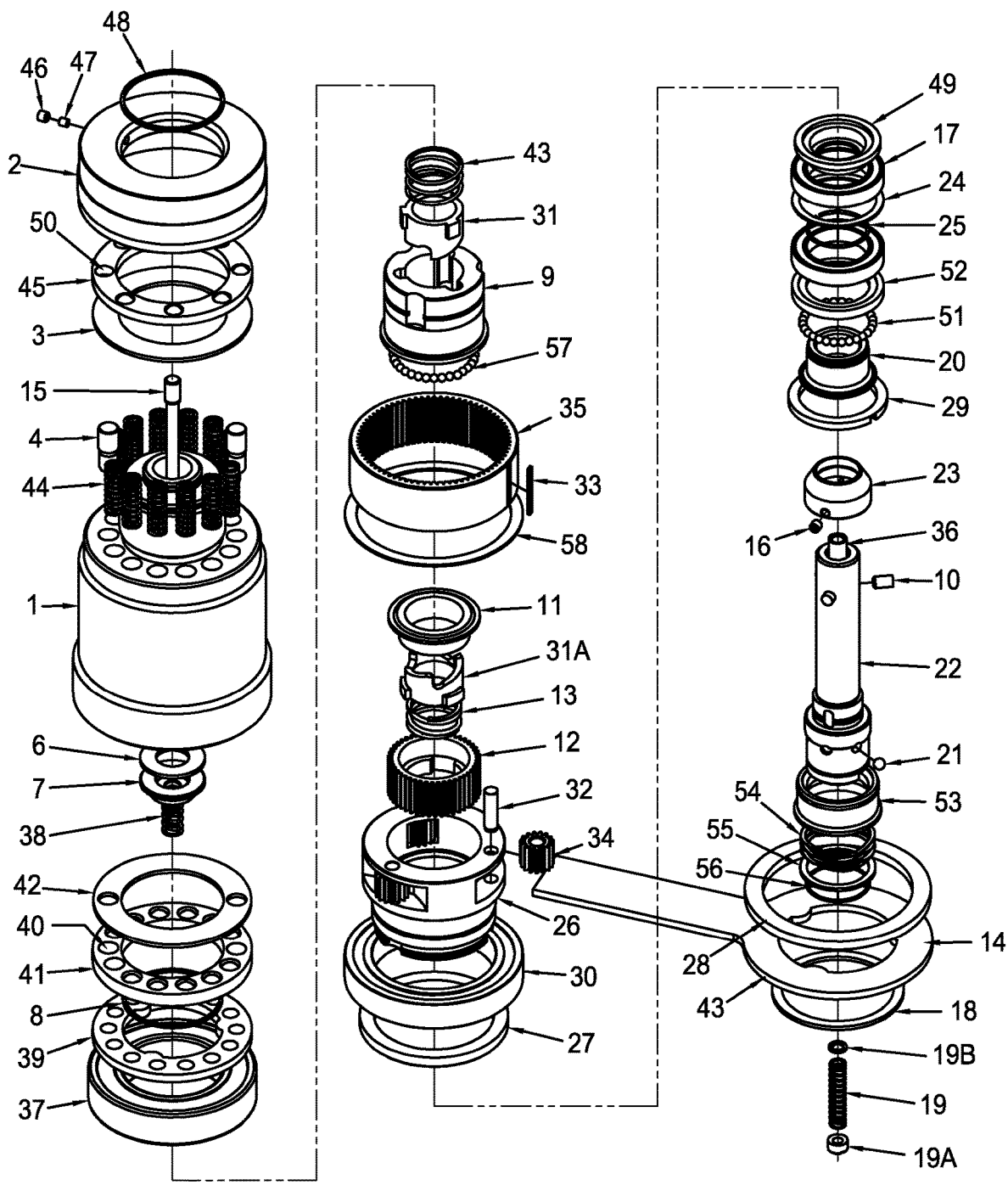
FIG. 1 is an exploded perspective view of parts which may be utilized for one embodiment of the invention.

FIG. 1 is an exploded perspective view of one embodiment of the invention, illustrating a self-reversing tapping attachment which further provides components or elements which allow for desired drilling or pre-drilling tap apertures with the same tapping attachment. The embodiment of the self-reversing tapping attachment shown in FIG. 1 may be combined with a Quick Connect or "QC" attachment mechanism that provides for relatively fast changes between a drill and a tap adapted for that Quick Connect mechanism.

It will be noted by those of ordinary skill in the art that Quick Change types of connectors and adapters have long been known in the industry and will not be described in detail herein. An example of one such mechanism or device is described in U.S. Pat. No. 5,271,697, issued to Tapmatic Corporation on Dec. 21, 1993, and which is incorporated herein by this reference.

FIG. 1 illustrates housing 1, clutch cap 2, spring washer 3, clutch pin 4, housing friction washer 6, spindle stop 7, clutch driver return ring 8, clutch sleeve 9, drive pin 10, friction washer 11, reversing sleeve 12, reverse driver spring 13, stop arm 14, guide spindle 15, flat point set screw 16, reverse bearing 17, retaining ring 44 (such as a Spirolox brand), return spring 19, guide spindle nut 19a, washer 19b, drive spindle bushing 20, Quick Change ball 21, Quick Change drive spindle 22, depth control collar 23, washer 24, retaining ring 25, gear carrier 26, lock nut 27, housing locknut 28, lock nut 29, housing bearing 30, spring bias driver 31, reversing driver 31a, gear pin 32, key 33, planet gear 34, ring gear 35, clutch bearing 37, safety cushion spring 38, clutch driver 39, steel balls 40, ball clutch plate 41, friction washer 42, cushion or drive spring 43, clutch spring 44, ball retainer 45, clutch cap plug 47, clutch cap ring 48, thrust washer 49, steel balls 50, steel balls 51, thrust bearing ring or thrust washer 52, Quick Change sleeve 53, wave spring 54, Quick Change washer 55, Quick Change retaining ring 56, steel balls 57 and washer 58. The combination of the Quick Change sleeve 53, Quick Change balls 21, Quick Change washer 55 and Quick Change retaining ring 56, generally comprise what is known in the industry as a Quick Change adapter.

Figure 2:
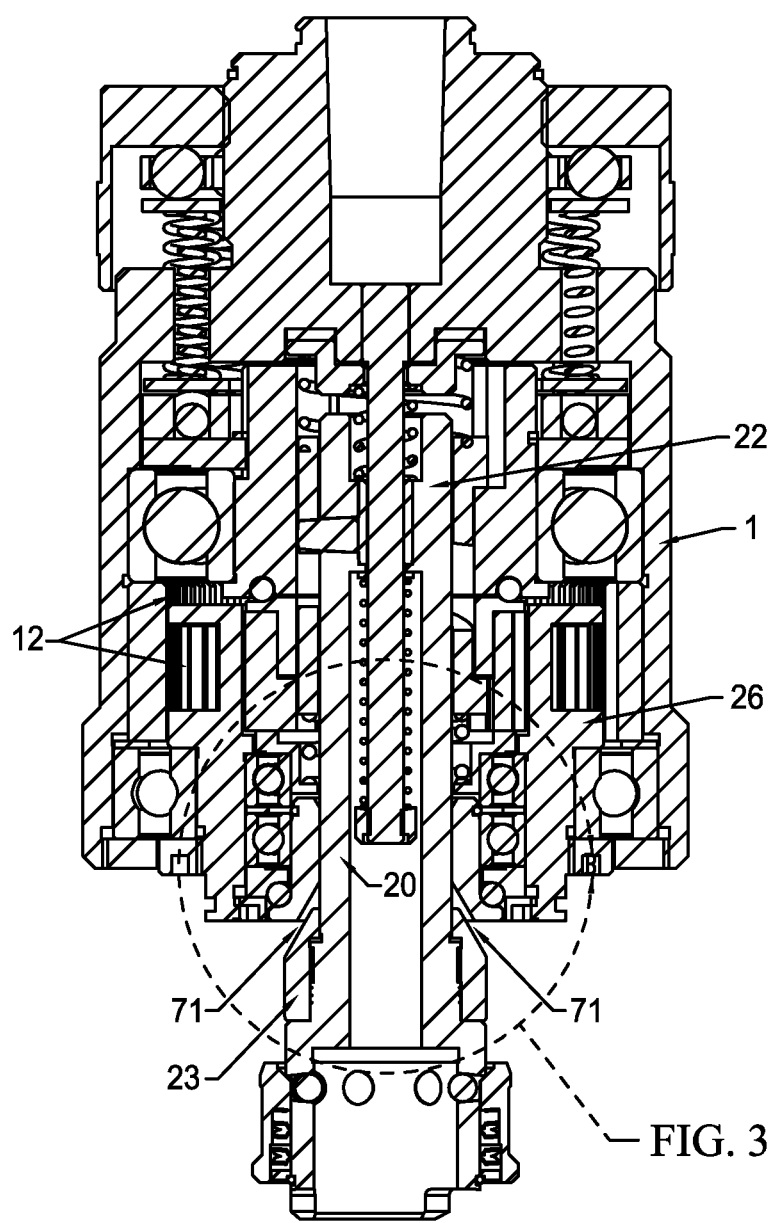
FIG. 2 is a cross-sectional elevation view of one embodiment of the invention as assembled and wherein the invention is in tapping mode.

FIG. 2 is a cross-sectional elevation view of the embodiment of the invention illustrated in FIG. 1, showing this embodiment of the invention in a position when it is not yet being guided for drilling operations. In this position the tapered depth control collar 23 is not in contact with the internal taper of the drive spindle bushing, 20. In this position the drive spindle 22 is able to move axially in the compression direction. This is the position for normal tapping operations.

Figure 3:
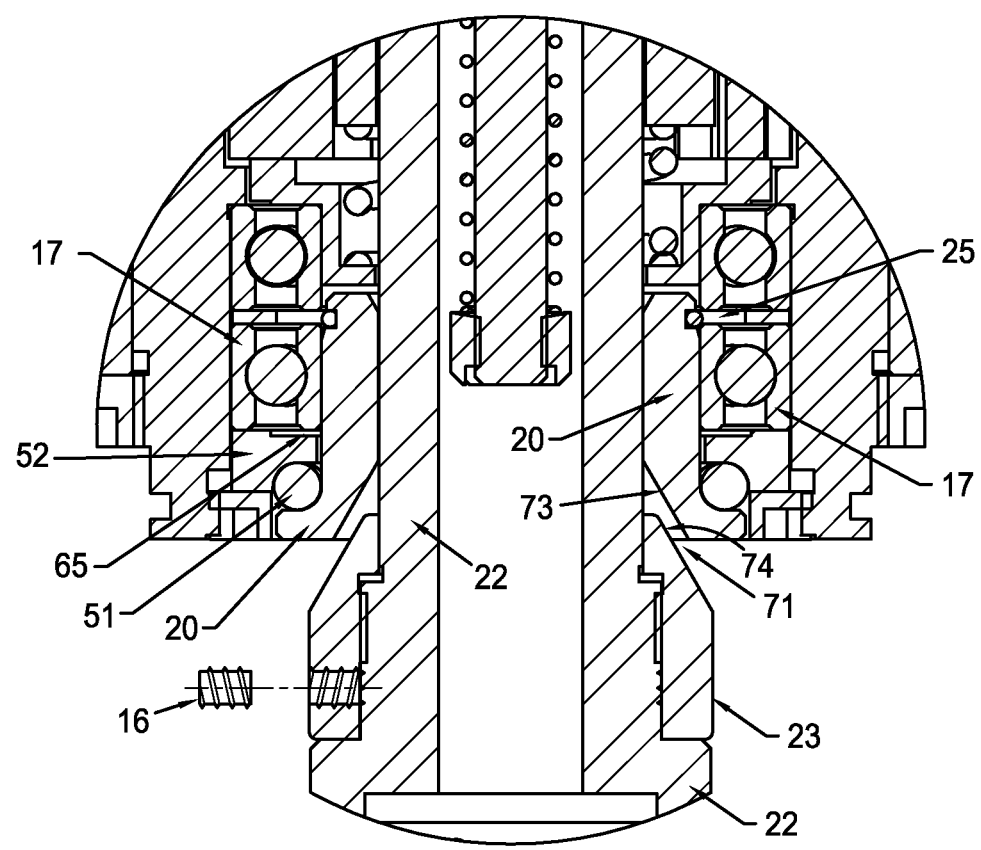
FIG. 3 is the detail identified in the embodiment of the invention illustrated in FIG. 2.

FIG. 2 shows housing, drive spindle 22, gear carrier 26, gap 71, drive spindle bushing 20, sloped or tapered surface 73 in the drive spindle bushing 20 and sloped surface 74 on the depth control collar 23 (both of which are shown in the detail in FIG. 3). The respective sloped surfaces 73 and 74 correspond to each other such that they operationally abut one another or fit snugly together.

FIG. 3 is a detail view from FIG. 2 of the area in this embodiment of the invention that provides guidance or a guiding mechanism. In this view the tapered depth control collar 23 (tapered surface 74) is still not engaged in the internal taper (surface 73) of the drive spindle bushing 20. The drive spindle bushing 20 is within bearing 17 and is able to rotate with the drive spindle 22 and the depth control collar 23. The gear carrier 26 is not rotating. It is held in place by the stop arm 14 similar to other self-reversing tapping attachments. The bearing 17 helps keep the drive spindle bushing 20 concentric. Depth control collar 23 is tapered or sloped at surface 74, which corresponds to the sloped surface 73 of the drive spindle bushing 20.

FIGS. 2 and 3 show this embodiment of the invention in tap mode such that there is a gap 71 between the respective surfaces 73 and 74, and said gap 71 provides the sufficient play, movement or compressibility to achieve the desired tapping qualities—a predetermined tapping configuration or mode. However as shown in FIG. 4, when the two surfaces 73 and 74 are abutting, then the integrated invention is configured for drilling—a predetermined drilling configuration or mode.

In this position the tapered depth control collar 23 is not in contact with the internal taper of the drive spindle bushing, 20. In this position the drive spindle 22 is able to move axially in the compression direction. This is the position for normal tapping operations.

FIG. 3 further shows gap 65, reverse bearing 17, thrust bearing ring or thrust washer 52, steel ball 51 as part of bearing, drive spindle bushing 20, Quick Change drive spindle 22, depth control collar 23, thrust bearing ring 52 combined with steel ball 51 to provide a thrust bearing. Drive spindle bushing 20 may be press-fit into place and reverse bearing 17 provides, guides and/or contributes to the concentricity support for operations. Drive spindle bushing 20 rotates with the spindle and provides guidance for it.

Figure 4:
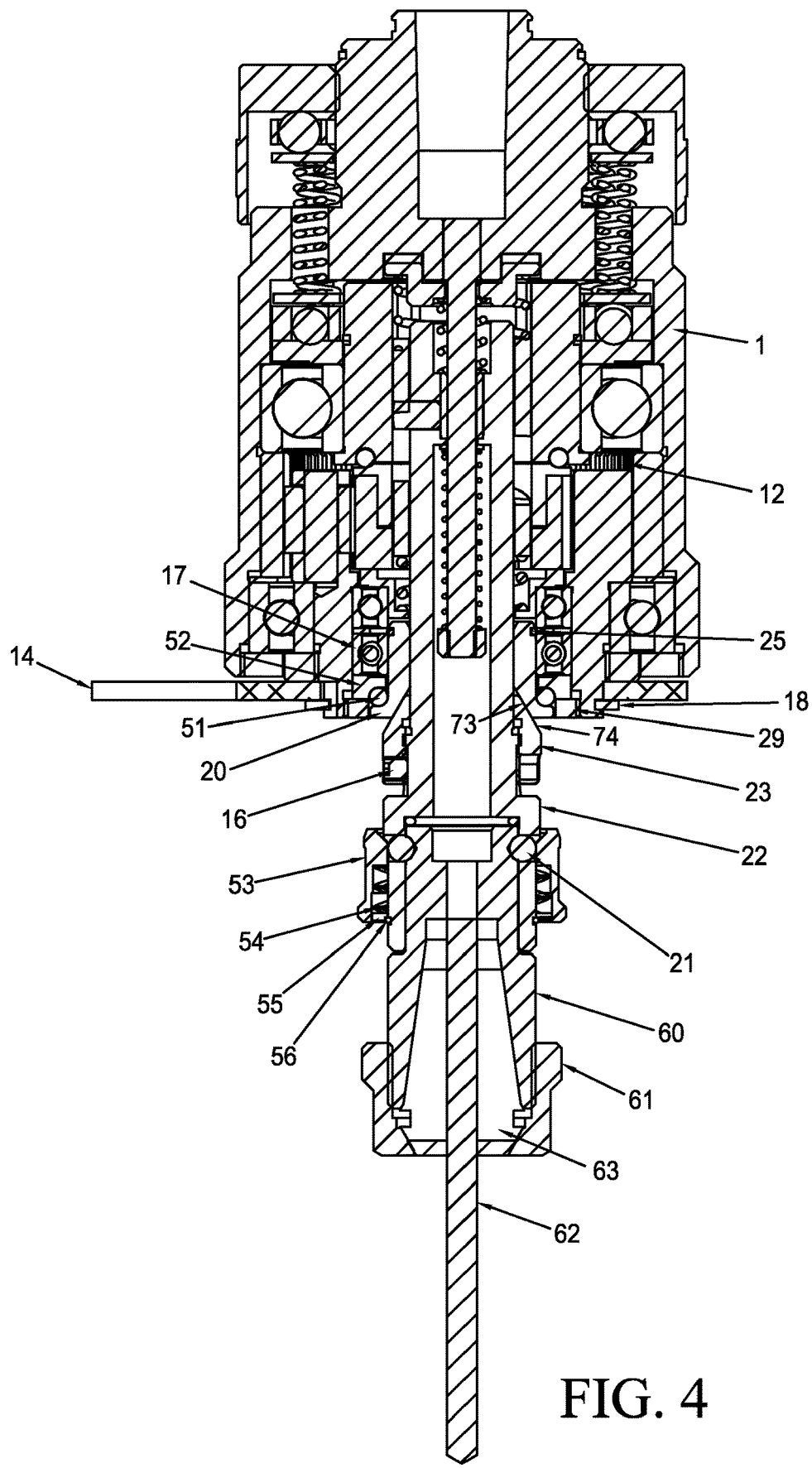
FIG. 4 is a cross section elevation view of the embodiment of the invention illustrated in FIGS. 2 & 3, and further showing the position of the depth control collar moved up and engaging the inside of the taper of the drive spindle bushing, i.e. in drilling mode.

FIG. 4 is a cross section elevation view of the embodiment of the invention illustrated in FIGS. 2 and 3, and further showing the position of the depth control collar 23 moved up such that the sloped or tapered surface 74 of the depth control collar 23 abuts and operationally engages the tapered inside surface 73 in the drive spindle bushing 20. FIG. 4 illustrates the embodiment of the invention in a position for drilling operations or drilling mode.

FIG. 4 further illustrates that the depth control collar 23 is threaded on to the drive spindle 22 and its position on the drive spindle can be adjusted and then locked in place with set screw 16. Now the internal taper of the bushing 20 is guiding the taper of the depth control collar 23 holding the spindle 22 concentric. FIG. 3 illustrates set screw 16 in the depth control collar 23 and the set screw 16 is a position lock mechanism to fix or lock the position of the depth control collar 23 relative to the spindle.

If a hard start for example is desired for drilling mode, the depth control collar 23 can be slid or moved up the drive spindle 22 such that the sloped or tapered outer surface 74 on the depth control collar 23 abuts the corresponding tapered inner surface of the drive spindle bushing 20. The set screw 16 can then be used to fix that predetermined position for drill mode, which due to the abutting tapered surfaces 73 & 74, provides concentric support.

If a cushioned setting or start for example is desired for tapping mode, the depth control collar 23 can be slid or moved a predetermined distance up the drive spindle 22, but not all the way up, and then using the set screw 16 to fix the depth control collar 23 in a predetermined position for tapping. A distance or gap 71 between the tapered surfaces 73 and 74 then allows the springs to provide a predetermined amount of compression or cushion for tapping. The magnitude of the gap which is set or locked in by the set screw 16 would determine the amount of cushion or compression and this configuration may allow both axial and radial cushion or movement as desired or predetermined.

FIG. 4 illustrates this embodiment of the invention in a drilling position or mode, whereas FIG. 2 illustrates this embodiment of the invention in a tapping position wherein the desired axial compressibility is provided for improved tap quality.

In drilling operations, it requires higher thrust force to drive the drill into the work piece. Relying on a normal bearing like bearing 17 to bear the thrust force for drilling is not ideal and could lead to damage to the bearing. To support the thrust force and prevent damage to the bearing 17, embodiments of the invention include a ring of balls 51 and a special thrust washer 52. This transfers the thrust force from the drilling operation away from the inner race of the bearing 17 to its outer race. This is shown in the detail of FIG. 3 where the thrust washer 52 is configured to transmit downward or upward force from drilling to the outer portion or race of bearing 17 and gap 65 helps facilitate the reduction or removal of the force from the inner race of bearing 17.

The ring of balls 51 acts similar to a thrust bearing and this supports the forces needed for drilling and prevents damage to the bearing 17. The combination of the bearing 17, tapered guidance, thrust bearing balls 51 and thrust washer 52 of embodiments of this invention now allow the support of drilling operations in combination with for example a self-reversing tapping attachment.

Generally, for tapping, no pressure needs to be applied to the tap as taps tend to self-feed, combined with some compression or cushion. For the drilling configuration it is desired to have a hard start and to eliminate compression or movement and provide concentricity support, guidance or control.

FIG. 4 further illustrates Quick Change ball 21, retaining ring 25, lock nut 29, cushion or drive spring 43, stop arm 14, Spirolox retaining ring 18, Quick Change sleeve 53, wave spring 54, Quick Change washer 55, Quick Change retaining ring 56, chuck portions 60 and 61, drill bit 62, and collet 63.

As will be appreciated by those of reasonable skill in the art, there are numerous embodiments to this invention, and variations of elements and components which may be used, all within the scope of this invention. In one embodiment for example, an integrated tapping and drill attachment is provided which includes: a tapping attachment configured to be fixed at a predetermined tapping configuration which provides compressibility between a drive spindle and a tapping tool, and further configured to be fixed at a predetermined drilling configuration which provides a non-compressible connection between the drive spindle and a drill.

In addition to the embodiment disclosed in the preceding paragraph, the invention may be further wherein a depth control collar is mounted around the drive spindle is fixed in a first position relative to the drive spindle for the predetermined drilling configuration; the depth control collar around the drive spindle is fixed in a second position relative to the drive spindle for the predetermined tapping configuration; and/or further comprising a drive spindle bushing which rotates with the drive spindle and which includes a concentric tapered inner surface; and a depth control collar movable mounted relative to the drive spindle and which includes a concentric tapered outer surface which corresponds to the concentric tapered inner surface.

A further example of an embodiment of the invention may be a self-reversing integrated tapping and drilling attachment comprising: a housing; a drive spindle within the housing and operatively attached to the rotational output of the rotation reversing mechanism; a rotation reversing mechanism operatively attached to the drive spindle with a rotational output which may be reversed; a tool adapter operatively attached to the drive spindle such that the tool adapter rotates with the drive spindle, the tool adapter being configured to receive a tap or a drill; a drive spindle bushing which rotates with the drive spindle and which includes a concentric tapered inner surface; and a depth control collar movable mounted relative to the drive spindle and which includes a concentric tapered outer surface which corresponds to the concentric tapered inner surface. A still further embodiment thereof may also include that the tool adapter is a quick change tool adapter configured to receive a tap or a drill.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A self-reversing integrated tapping and drill attachment comprising a tapping attachment configured to be fixed at a predetermined tapping configuration which provides compressibility between a drive spindle and a tapping tool, and further configured to be fixed at a predetermined drilling configuration which provides a non-compressible connection between the drive spindle and a drill; the tapping attachment further including a thrust washer and ring of balls in force transmitting disposition between a rotational bearing with an inner race and an outer race, and a drive spindle bushing within the tapping attachment, the thrust washer including a lower portion in which the ring of balls is seated and an upper portion which abuts a lower surface of the bearing, and wherein a radially inward portion of the upper portion of the thrust washer is offset from the inner race of the bearing such that thrust forces from the drive spindle bushing are transmitted to the outer race of the bearing.

2. A self-reversing integrated tapping and drill attachment as recited in claim 1, and further wherein a depth control collar around the drive spindle is fixed in a first position relative to the drive spindle for the predetermined drilling configuration.

3. A self-reversing integrated tapping and drill attachment as recited in claim 2, and further wherein the depth control collar around the drive spindle is fixed in a second position relative to the drive spindle for the predetermined tapping configuration.

4. A self-reversing integrated tapping and drill attachment as recited in claim 1, and further comprising:
   the drive spindle bushing which rotates with the drive spindle and which includes a concentric tapered inner surface; and
   a depth control collar movable mounted relative to the drive spindle and which includes a concentric tapered outer surface which corresponds to the concentric tapered inner surface.

5. A self-reversing integrated tapping and drilling attachment comprising:
   a housing;
   a forward driver and a reversing driver within the housing and each engageable with the drive spindle such that a rotational output of the drive spindle may be reversed;

a drive spindle within the housing and configured to alternately engage the forward driver and reversing driver, thereby providing a reversible rotational output;

a tool adapter operatively attached to the drive spindle such that the tool adapter rotates with the drive spindle, the tool adapter being configured to receive a tap or a drill;

a drive spindle bushing which rotates with the drive spindle and which includes a concentric tapered inner surface;

a bearing configured around the drive spindle bushing, the bearing including an upper surface and a lower surface and an inner race and an outer race;

a thrust washer and a ring of balls in force transmitting disposition between the drive spindle bushing and the lower surface of the bearing, the thrust washer including a lower portion in which the ring of balls is seated and an upper portion which abuts the lower surface of the bearing, and wherein a radially inward portion of the upper portion of the thrust washer is offset from the inner race of the bearing such that thrust forces from the drive spindle bushing are transmitted to the outer race of the bearing; and a depth control collar movable mounted relative to the drive spindle and which includes a concentric tapered outer surface which corresponds to the concentric tapered inner surface.

6. The self-reversing integrated tapping and drilling attachment as recited in claim 5, and further wherein the tool adapter is a quick change tool adapter configured to receive a tap or a drill.

* * * * *